United States Patent
Arauchi

[11] 3,867,619
[45] Feb. 18, 1975

[54] DESK TOP ELECTRONIC COMPUTER WITH DIGITAL CLOCK

[75] Inventor: Keijiro Arauchi, Tokyo, Japan

[73] Assignee: Tobishi Pharmaceutical Co., Ltd.

[22] Filed: June 5, 1973

[21] Appl. No.: 367,289

[30] Foreign Application Priority Data
June 24, 1972 Japan.............................. 47-63537

[52] U.S. Cl................ 235/156, 58/50 R, 58/152 R
[51] Int. Cl........................ G06f 7/48, G04b 47/00
[58] Field of Search................... 235/156, 152, 160; 58/23 R, 23 A, 23 BA, 24 R, 24 A, 152 R, 50R

[56] References Cited
UNITED STATES PATENTS

| | | |
|---|---|---|
| 3,505,804 | 4/1970 | Hofstein .......................... 58/23 BA |
| 3,691,755 | 9/1972 | Girard ............................. 58/23 BA |
| 3,765,163 | 10/1973 | Levine et al...................... 58/23 BA |
| 3,768,247 | 10/1973 | Fujita ................................. 58/23 R |
| 3,816,730 | 6/1974 | Yamamoto et al. ................ 235/156 |
| 3,818,457 | 6/1974 | Schleifer ..................... 235/156 UX |

Primary Examiner—Malcolm A. Morrison
Assistant Examiner—Jerry Smith
Attorney, Agent, or Firm—Ladas, Parry, Von Gehr, Goldsmith & Deschamps

[57] ABSTRACT

A set of a digital indicating circuit and an indicator are connected to digital clock circuit means and desk computer calculating circuit means through switching elements, a flip-flop, and a switching key so as to be commonly used in both digital clock and desk computer. Power circuit means is connected directly to the digital clock circuit means, and to the desk computer circuit means through the switch so that the digital clock circuit is at all times supplied with electric current.

2 Claims, 2 Drawing Figures

DESK TOP ELECTRONIC COMPUTER WITH DIGITAL CLOCK

BACKGROUND OF THE INVENTION

The present invention relates to an instrument having a digital indicating function, particularly to a desk top type electronic computer (hereinafter to be referred to as a "desk computer") and a digital clock.

In many offices and business establishments both a desk computer and a digital clock are used. However, since they are individual articles independent from each other, they have disadvantages in that they occupy relatively large space and that they involve a waste of time and cost on the part of manufacturers since the manufacturers must prepare components for each of them independently from each other and handle the components independently from each other.

Therefore, the object of the present invention is to provide a desk computer with a digital clock obviating the disadvantages described above.

SUMMARY OF THE INVENTION

In the present invention, taking note of the fact that each of the desk computer and the digital clock uses a digital indicating circuit and an indicator, a set of such digital indicating circuit and indicator are used commonly to the desk computer and the digital clock and are connected selectively to the desk computer and the digital clock by operating a switch. Even when the desk computer is in operation, the indication of the desk computer can be erased from the indicator tube and the hour can be indicated on the indicator tube by closing a switch key connected to a flip-flop. And, in this state, the indication of the desk computer can be displayed again on the indicator tube by opening the switch key, and by depressing any one of the calculating keys, an input signal can be given to the desk computer circuit thereby transmitting a setting signal to the flip-flop to switch the clock indication to the desk computer indication.

BRIEF DESCRIPTION OF THE ACCOMPANYING DRAWINGS

An embodiment of the present invention will now be described with reference to the accompanying drawings in which:

FIG. 1 is a schematic block diagram of the desk computer with digital clock according to the present invention; and, FIG. 2 is a detailed block diagram of the desk computer with digital clock according to the present invention.

DETAILED DESCRIPTION OF THE INVENTION

Figure 1:
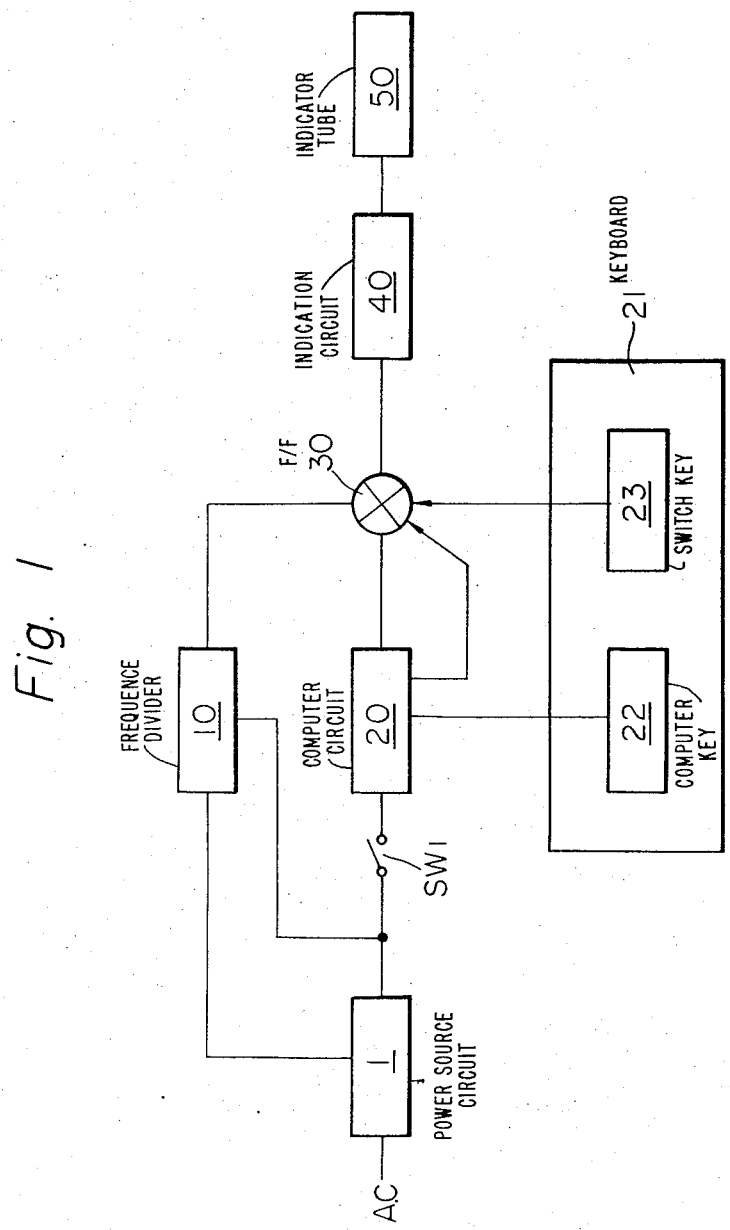

In FIG. 1, power source circuit means 1 connected to an A.C. power source is always connected to digital clock frequency divider circuit means 10 which is connected to a flip-flop 30. Desk computer circuit means 20 is connected to the power source circuit means 1 through a switch $SW_1$. The desk computer circuit means 20 is also connected to the flip-flop 30. A keyboard 21 has a desk computer key 22 and a clock switch key 23. The desk computer key 22 is connected to the desk computer circuit means 20 while the clock switch key 23 is connected to the flip-flop 30 which is connected to an indicator tube 50 through indication circuit means 40.

Since the A.C. power source is always connected to the frequency divider circuit means 10 through the power source circuit means 1, the digital clock is time-shared by the indication circuit means 40 through the flip-flop and indicates the time on the indicator tube 50. When the desk computer is used, the switch $SW_1$ is closed to feed electric power to the desk computer circuit means 20 thereby applying a desk computer setting pulse to the flip-flop. The indication of the digital clock is erased from the indicator tube 50 and the data from the desk computer is given to the indicator tube 50 through the indication circuit means 40.

Figure 2:
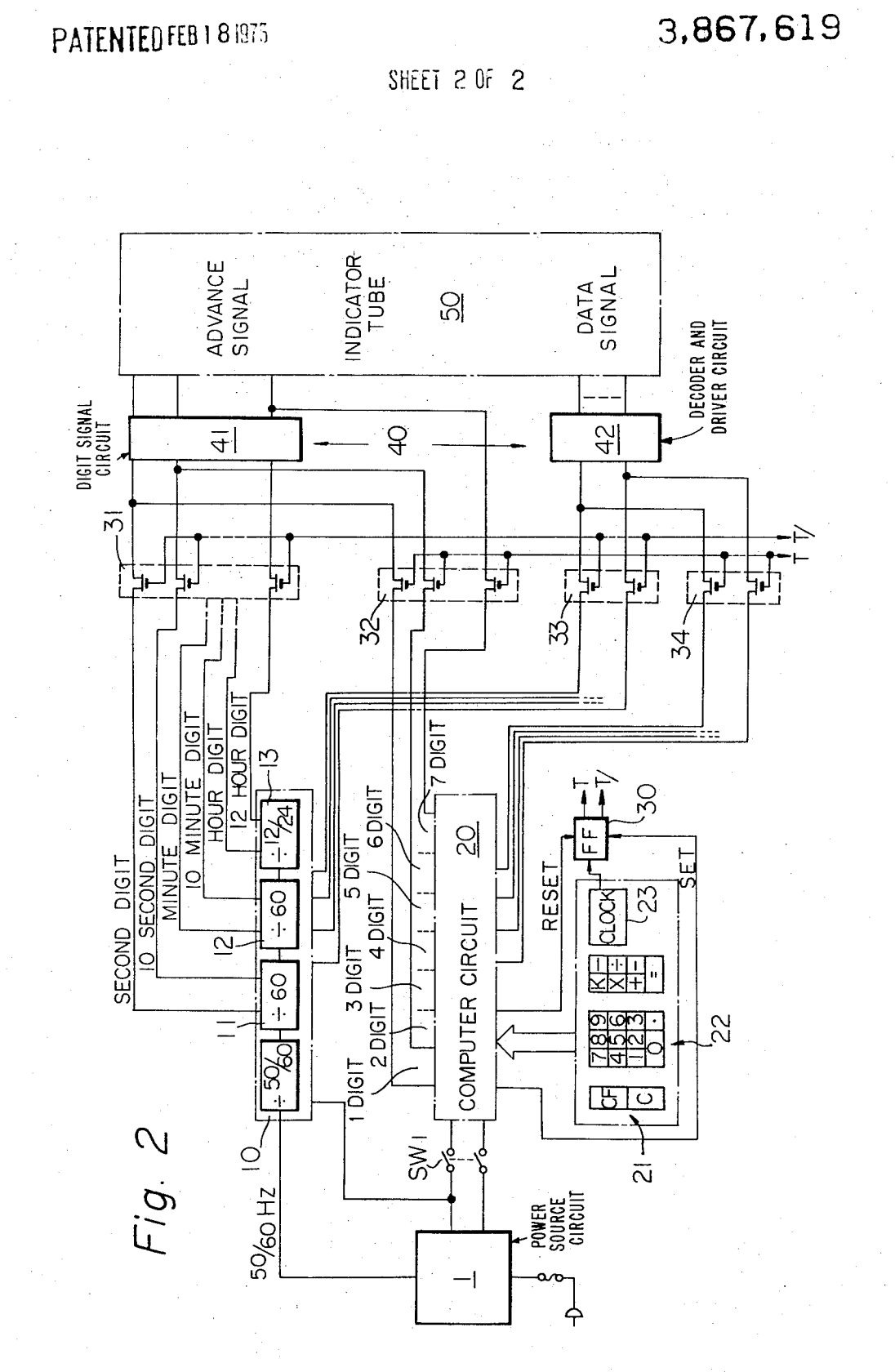

In the embodiment of FIG. 2, the power source circuit means 1 is connected to an A.C. power source. The power source circuit means 1 is always connected to the digital clock frequency divider circuit means 10, which is provided with a second digit and 10 seconds digit by a counter 11 having decimal and hexal counters, with a minute digit and 10 minutes digit by a counter 12 having decimal and hexal counters, and with an hour digit and 12 hours digit by a duodecimal or icositetral counter 13. Each digit signal output of each of the counters 11, 12, and 13 is connected to each drain of switching devices such as field-effect transistors 31. Each source of the field-effect transistors 31 is connected to the indicator tube 50 through a digit signal circuit means 41, which has a capacity of dealing with 6 digits only. Each gate of the field-effect transistors 31 is connected to an output side of the flip-flop 30. Data signal output of each counter is connected to drain of field-effect transistors 33. Source of the field-effect transistors 33 is connected to the indicator tube 50 through a decoder and driver circuit means 42, and gate of the field-effect transistors 33 is connected to the output side of the flip-flop.

The desk computer circuit means 20 is connected to the power source circuit means through the switch $SW_1$. Each digit signal output of the desk computer circuit means 20 is connected to the drain of switching devices such as field-effect transistors 32. Source of the field-effect transistors 32 is connected to the indicator tube 50 through a digit signal circuit means 41, and gate of the field-effect transistors 32 is connected to the other output side of the flip-flop. Each data signal output of the desk computer circuit means 20 is connected to each drain of field-effect transistors 34. Source of the field-effect transistors 34 is connected to the indicator tube 50 through the decoder and the driver circuit means 42, and gate of the field-effect trnasistors 34 is connected to the other output side of the flip-flop. The key-board 21 of the desk computer has, beside the calculating keys 22, the switch key 23 which is designed to control the flip-flop 30. When the switch $SW_1$ is closed, electric power is fed to the desk computer circuit means 20 which gives a desk computer setting signal to the flip-flop 30. When the switch $SW_1$ is opened, the desk computer circuit means 20 gives a desk computer resetting signal to the flip-flop 30 to shut off the supply of electric power to the desk computer circuit means.

The operation of the apparatus according to the present invention will now be described. When the power source circuit means 1 is connected to the A.C. power source, the frequency divider circuit means 10 of the clock is always fed with electric power. The electric power is time-shared by the frequency divider circuit means 10, and digit signal outputs from the frequency divider circuit means are transmitted to the indicator tube 50 via the digit signal circuit means 41 through the field-effect transistors 31. Data signal outputs of the frequency divider circuit means 10 are transmitted to the indicator tube 50 via the decoder and driver circuit 42 through the field-effect transistors 33, whereby the time is indicated on the indicator tube. The flip-flop 30 reverses its mode whenever it receives a setting signal in response to an operation of the key switch 23. In the mode in which the clock is operating, even when the switch 23 is depressed repeatedly, the indication is made only for the clock since the desk computer is, in this mode, made independent of the indicator tube. Repeated depression of the switch 23 only makes the indicator tube turn on and off the indication of time thereon.

When the desk computer is to be used, the power source switch $SW_1$ of the desk computer is closed, whereby an automatic clearing signal from the desk computer sets the flip-flop to reverse the outputs of the flip-flop, namely, to make $T/ = 0$, $T = 1$. Accordingly, the outputs are given to the field-effect transistors 32, 34. And, by operating the calculating keys 22, the digit signal from the desk computer circuit means 20 is transmitted through the field-effect transistors 32 to the digit signal circuit means 41 while the data signal is transmitted through the field-effect transistors 34. Thus, the calculated value is indicated on the indicator tube 50.

When it is desired to know the time while the power source switch $SW_1$ is closed, namely while the desk computer is in operation, only the switch key 23 on the keyboard 21 is required to be closed. By this operation the outputs of the flip-flop are reversed from $T/ = 0$, $T = 1$ to $T/ = 1$, $T = 0$ thereby deenergizing the field-effect transistors 32, 34 and energizing the field-effect transistors 31, 33. Accordingly, the operating mode of the apparatus is switched from the desk computer to the clock. In order to revert from this clock mode to the computing mode, it is only required that any key on the keyboard be depressed whereby the flip-flop setting signal from the desk computer reverses the outputs of the flip-flop from $T/ = 1$, $T = 0$ to $T/ = 0$, $T = 1$. By this operation, the indication on the indicator tube 50 is returned from the clock to the desk computer. By opening the power source switch $Sw_1$ after the completion of calculation, the flip-flop signal resetting from the desk computer circuit 20 again reverses the outputs of the flip-flop so that the indicator tube 50 indicates the time.

The desk computer with clock according to the present invention is very useful since it can be used as a digital clock while not in use as a computer. And, since in the desk computer with clock according to the present invention the indicating circuit and indicator tube are used commonly to the clock and the desk computer, it takes far smaller space than the separate desk computer and clock of prior art which are combined for convenience and is less expensive.

In the desk computer with clock according to the present invention, since precedence is given to the computer it can perform calculation at any desired time.

What is claimed is:

1. A desk top type electronic computer with a digital clock, comprising:

power source circuit means;

frequency divider circuit means of a digital clock, said frequency divider circuit means being connected at all times at its input to said power source circuit means and providing digit and data signal outputs;

a desk computer circuit means for providing digit and data signal outputs and setting and resetting signal outputs;

an indicating circuit means and an indicator tube controlled thereby for use in common by the computer and the clock;

a plurality of switching devices for selectively connecting the digit and data signal outputs from said frequency divider circuit means and the digit and data signal outputs from said desk computer circuit means to said indicating circuit meanns;

a flip-flop connected in controlling relationship to said switching devices and in controlled relationship to said desk computer circuit means;

a keyboard for said desk computer circuit, said keyboard including calculating keys, the depression of any one of which provides a setting signal to said flip-flop from said desk computer circuit; and a switch connected between said power source circuit means and said desk computer circuit means for causing said desk computer circuit means to supply a setting signal to said flip-flop upon being closed and a resetting signal thereto upon being opened.

2. A desk top type electronic computer with a digital clock according to claim 1, wherein said keyboard further includes switch key means operable to reverse the output mode of said flip-flop when the switch connected between the power circuit means and the desk computer circuit means is closed.

* * * * *